(12) United States Patent
Dohmann et al.

(10) Patent No.: US 10,899,061 B2
(45) Date of Patent: Jan. 26, 2021

(54) COOLING AND VACUUM TANK (71) Applicant: battenfeld-cincinnati Germany GmbH, Bad Oeyenhausen (DE)

(72) Inventors: Heinrich Dohmann, Hoexter (DE); Joerg Droege, Kerken (DE)

(73) Assignee: BATTENFELD-CINCINNATI GERMANY GMBH, Bad Oeyenhausen (DE)

( * ) Notice: Subject to any disclaimer, the term of this patent is extended or adjusted under 35 U.S.C. 154(b) by 232 days.

(21) Appl. No.: 15/754,593

(22) PCT Filed: Aug. 24, 2016

(86) PCT No.: PCT/EP2016/069978
§ 371 (c)(1),
(2) Date: Feb. 23, 2018

(87) PCT Pub. No.: WO2017/032800
PCT Pub. Date: Mar. 2, 2017

(65) Prior Publication Data
US 2018/0257288 A1 Sep. 13, 2018

(30) Foreign Application Priority Data

Aug. 25, 2015 (DE) .................. 10 2015 114 109

(51) Int. Cl.
*B29C 48/90* (2019.01)
*B29C 48/09* (2019.01)
(Continued)

(52) U.S. Cl.
CPC ............ *B29C 48/905* (2019.02); *B29C 48/09* (2019.02); *B29C 48/12* (2019.02); *B29C 48/503* (2019.02); *B29C 48/908* (2019.02); *B29C 48/911* (2019.02)

(58) Field of Classification Search
CPC .................................................. B29C 48/905
See application file for complete search history.

(56) References Cited

U.S. PATENT DOCUMENTS 3,886,243 A * 5/1975 Uemura .................. B29C 48/92
264/40.3
4,029,452 A * 6/1977 Schippers ............... B29C 48/09
425/71
(Continued)

FOREIGN PATENT DOCUMENTS

AT          6407 U1    10/2003
DE    102009041628 A1   12/2010
(Continued)

OTHER PUBLICATIONS

Espacenet machine translation of JP-11090973-A (1999); retrieved Dec. 5, 2019.*

(Continued)

*Primary Examiner* — Matthew J Daniels
*Assistant Examiner* — Paul Spiel
(74) *Attorney, Agent, or Firm* — Leydig, Voit & Mayer, Ltd.

(57) ABSTRACT

A calibration and cooling tank of an extrusion line, which connects to an extrusion tool, wherein a vacuum can be applied to the calibration and cooling tank for calibrating the plastic melt emerging from the extrusion tool, wherein the calibration and cooling tank extends along an extrusion axis. The calibration and cooling tank is modularly structured, wherein at least one module forms a calibration and cooling section and the module has a connection region on both sides to which an additional module can be attached. The connection region includes a flange that extends from the base element of the calibration and cooling tank to the outside.

13 Claims, 11 Drawing Sheets

(51) Int. Cl.
*B29C 48/12* (2019.01)
*B29C 48/50* (2019.01)
*B29C 48/88* (2019.01)

(56) References Cited

U.S. PATENT DOCUMENTS

| | | | | |
|---|---|---|---|---|
| 4,165,354 A | * | 8/1979 | Iida | B29C 35/16 264/178 R |
| 4,247,506 A | * | 1/1981 | Summers | B29C 48/09 264/177.16 |
| 4,398,879 A | * | 8/1983 | DuPont | B29B 13/025 425/392 |
| 5,139,402 A | * | 8/1992 | Topf | B29C 48/09 425/71 |
| 5,645,861 A | * | 7/1997 | Czarnik | B29C 31/002 425/71 |
| 2001/0018078 A1 | | 8/2001 | Kossl | |
| 2005/0120771 A1 | | 6/2005 | Hofmann et al. | |
| 2006/0159794 A1 | | 7/2006 | Schwaiger | |
| 2008/0118593 A1 | | 5/2008 | Gruber et al. | |
| 2015/0048542 A1 | * | 2/2015 | Gross | B29C 48/256 264/209.4 |
| 2016/0089846 A1 | * | 3/2016 | McCartney | B29C 48/09 428/34.9 |

FOREIGN PATENT DOCUMENTS

| | | | |
|---|---|---|---|
| EP | 1524093 A1 | 4/2005 | |
| JP | 11090973 A | * 4/1999 | B29C 48/92 |
| WO | WO 9749533 A1 | 12/1997 | |
| WO | WO 2006060837 A1 | 6/2006 | |

OTHER PUBLICATIONS

N. N. "Complete Extrusion Lines for Plastic Pipes—Value Through Know-how", Nov. 30, 2014 (Nov. 30, 2014), pp. 1-12, XP055315712.

* cited by examiner

Fig. 1

PRIOR ART

COOLING AND VACUUM TANK

CROSS-REFERENCE TO PRIOR APPLICATIONS

This application is a U.S. National Phase application under 35 U.S.C. § 371 of International Application No. PCT/EP2016/069978, filed on Aug. 24, 2016, and claims benefit to German Patent Application No. DE 10 2015 114 109.4, filed on Aug. 25, 2015. The International Application was published in German on Mar. 2, 2017 as WO 2017/032800.

FIELD

Calibration and cooling tank of an extrusion line positioned downstream of an extrusion die, the calibration and cooling tank withstanding being pressurized for the purpose of calibrating the plastic mold exiting the extrusion die, the calibration and cooling tank extending along an extrusion axis.

BACKGROUND

As an example, WO 2006 06 0837 A1 is known from prior art. The patent describes an apparatus for calibrating an extruded plastic profile comprising a shaping and extrusion tool and a rack adjustable in longitudinal direction with respect to the plastic profile, the extrusion tool/rack comprising a cooling tank and a dry calibration device between the cooling tank and the extrusion die which is attached to a beam, is exchangeable, and can be connected to supply lines for the supply and removal of cooling liquid on the one hand and for creating an underpressure on the other hand. To ensure favorable installation conditions, it is suggested that the beam which can be adjusted in longitudinal direction of the plastic profile relative to the cooling tank form a distributor that is connected to the supply lines with cable transitions for the cooling liquid and the underpressure in the attachment area of the dry calibration device which in turn is equipped with the fitting cable transitions.

AT 6407U1 and US 20010018078 as well reveal a process for controlling the vacuum supply of calibration dies in which air is extracted into a joint pressure vessel. From US20010018078 a shaping device for an extrusion line is known which comprises at least a calibration device with several calibration dies arranged downstream of one another in an extrusion direction, and at least one exit.

SUMMARY

An aspect of the invention is to be able to offer a cooling and calibration tank, which on the one hand comprises few components and on the other hand is designed in such a way that a versatile use of the component parts is possible.

An embodiment of the invention includes a calibration and cooling tank designed as a modular structure, at least one module forming a calibration and cooling line, the module including a connection area at each end to which a further module can be attached, the connection area being designed as a flange which extends outward from the main body of the calibration and cooling tank, the cross section of the main body resembling the shape of an egg.

By means of these flanges directed outward, which can also be edged directly from the metal sheet of the main body, the interior of the tank is ensured to consist mostly of smooth and continuous surfaces. Unsightly edges and beads are thus avoided. Each length of calibration and cooling tanks is conceivable, since practically identical modules can be stringed together. The standardized design of the module covers various sizes, thus allowing for pumps, water distributors, etc. to be attached to each module and each size of modules. For this and in accordance with the invention, the cylindrical form has been altered in such a way that a larger amount of water can be held under the tube, thus causing the above-described egg shape. For that, the invention suggests the cross section of the main body to resemble the shape of an egg. Such egg-shaped main bodies can be produced by edging or rolling metal sheets consisting of one or multiple parts.

According to another aspect the module may comprise at least one main body consisting of an edged or rolled metal sheet with a continuous, yet not necessarily constant curve. This has the advantage that fewer components are necessary for the construction of one tank and the tank in sum is more compact without losing firmness and stability. The main body can be crafted out of several assembled metal sheets, or out of a single sheet.

Advantageously, the connection areas of each module are identically built, so that the first connection area of a first module can be attached to the second connection area of a second module. Thus the order of the modules installed one after the other can be arbitrarily altered and the modules can even be turned around themselves. It is thus irrelevant in which direction the module is integrated into a series of modules. Accordingly, there is no front or back or left or right respectively.

For some processes it is necessary for a cooling and calibration tank to comprise one or multiple chambers. The invention therefore allows for a partition wall to be inserted between two modules to be connected, thus creating a tank with two chambers. This design of the main body and the flange extending outward, the overall consistency of the interior of the tank is preserved even with the inserted partition wall.

It is especially advantageous to choose a cross-section geometry that allows for a maximal inherent vacuum rigidity on the one hand and on the other ideally combines the two functioning operating ranges of cooling the tube and collection the cooling water. In summary, the objective is to achieve minimal production costs in combination with maximum functionality.

As a general rule the invention refers to a container featuring an underpressure on the inside, or rather an overpressure on the outside. The walls of the container are exposed to compressive stress in their longitudinal direction and at the same are deflected from their stable position, which results in a loss of stability in the form of creases and dents. To counter this, the ideal choice of shape is a container supported in itself. A cylinder is preferable. Rather larger structures with large straight surfaces are unfavorable.

Naturally, the egg shape has a high degree of inherent stability and at the same time features the round shape necessary for the production of the tube. A sump results at the tip of the egg, in which the cooling water can be collected, and at the head of the egg the passage to the cap forms a unit.

Thus, the module comprises a cap that is designed to fit into a fixture for the cap in such a way that the cap is locked in position within the fixture and becomes a supporting part of the calibration and cooling tank once the vacuum is applied. With that, the egg-shaped cross section is closed.

In a further variant it is provided for C-profiles to be arranged at the module for the fastening of attachments.

These C-profiles are arranged at the module in mirror symmetry relative to a section plane vertical to the extrusion axis, so that attachments can be mounted regardless of the position of the module (turned around, different order, as described above). Thus, depending on the claim all attachments can be mounted to the C-profile within a left-hand or a right-hand version.

The exterior water distributor can also be attached to these C-profiles. Aspects of an exterior water distributor include:
  Equal water distributors can be used for different construction sizes.
  The exterior water distributor allows for individual control of the amount of water at the injector bars.
  Regarding production, the exterior water distributor is considerably easier to manufacture.
  If a module does not need a water distributor, the latter will not be mounted.

For yet another embodiment, it is contemplated to arrange a console for a pump at the cooling and calibration tank, the console being designed in such a way that it features a universal pump mount. Thus, all conventional pumps can be mounted.

The cooling and calibration tank advantageously comprises detachable pedestals which can be exchanged against taller pedestals, since the corresponding installation option of the pedestals to the module is identical for all pedestals. Smaller differences of height are realized by means of the running gear screwed to the pedestal.

According to an advantageous variant it is provided mounting plates are arranged within the module. Universal mounts for simple supporting disks or supporting rollers as well as supporting units (worm roller or scissors lifting units) which can be adjusted inline in accordance with the diameter of the tube can be attached to these mounting plates.

Further advantageous variants are set out herein.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
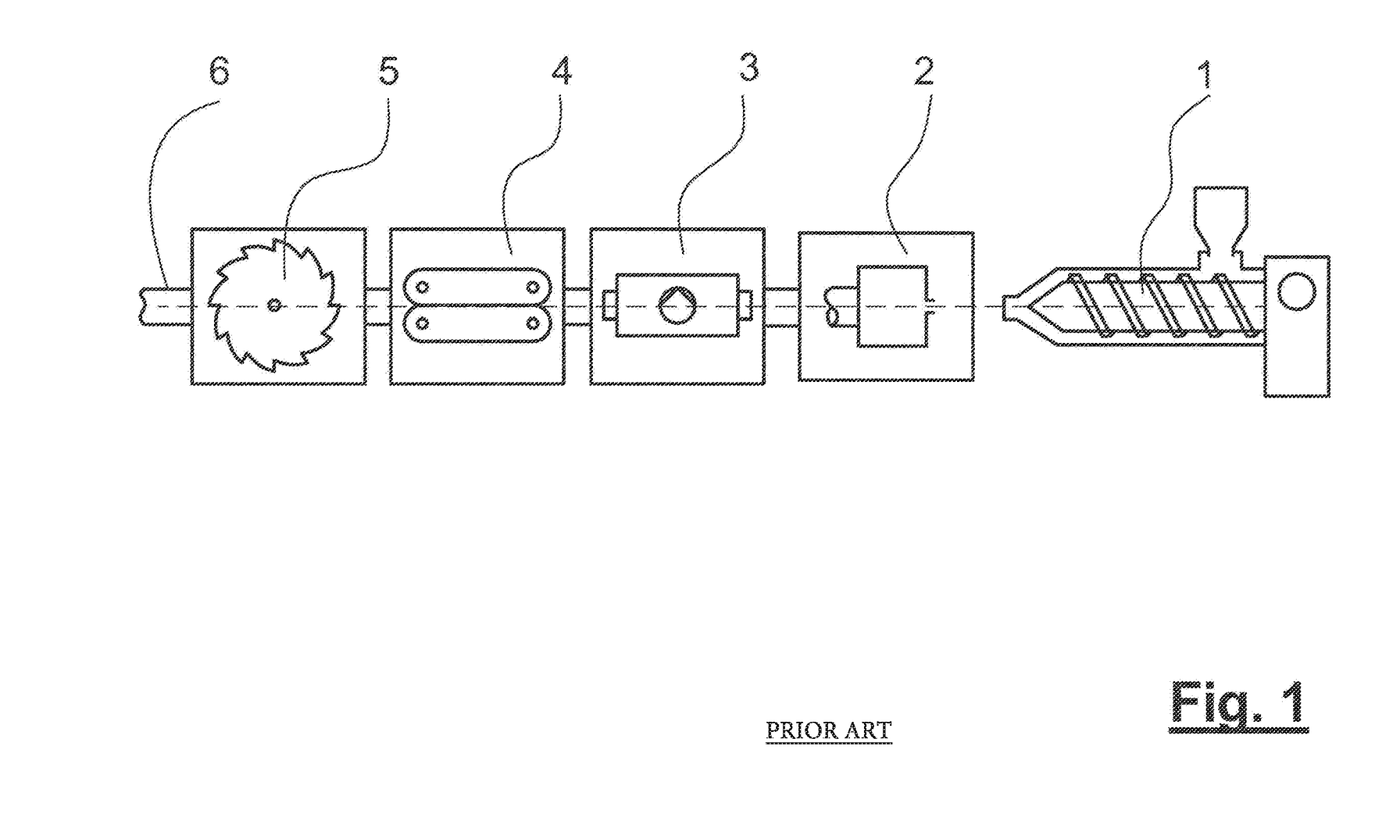
FIG. 1 shows a typical extrusion line,
FIG. 2 schematically shows the structure of a calibration and cooling line.

FIG. 1 shows a typical extrusion line as it is used nowadays for profile extrusion, regardless of whether it is applied for the production of window profiles or tubes. It shows the extruder 1, in which plastic is molten and continuously driven into the extrusion die 2 for shaping. Arranged downstream is a calibration and cooling station 3. Depending on the profile, further cooling stations can be used. An extraction device 4 is arranged after the cooling stations. To cut the continuous profiles 6 to the desired length, a cutting device 5 is arranged downstream.

Figure 2:
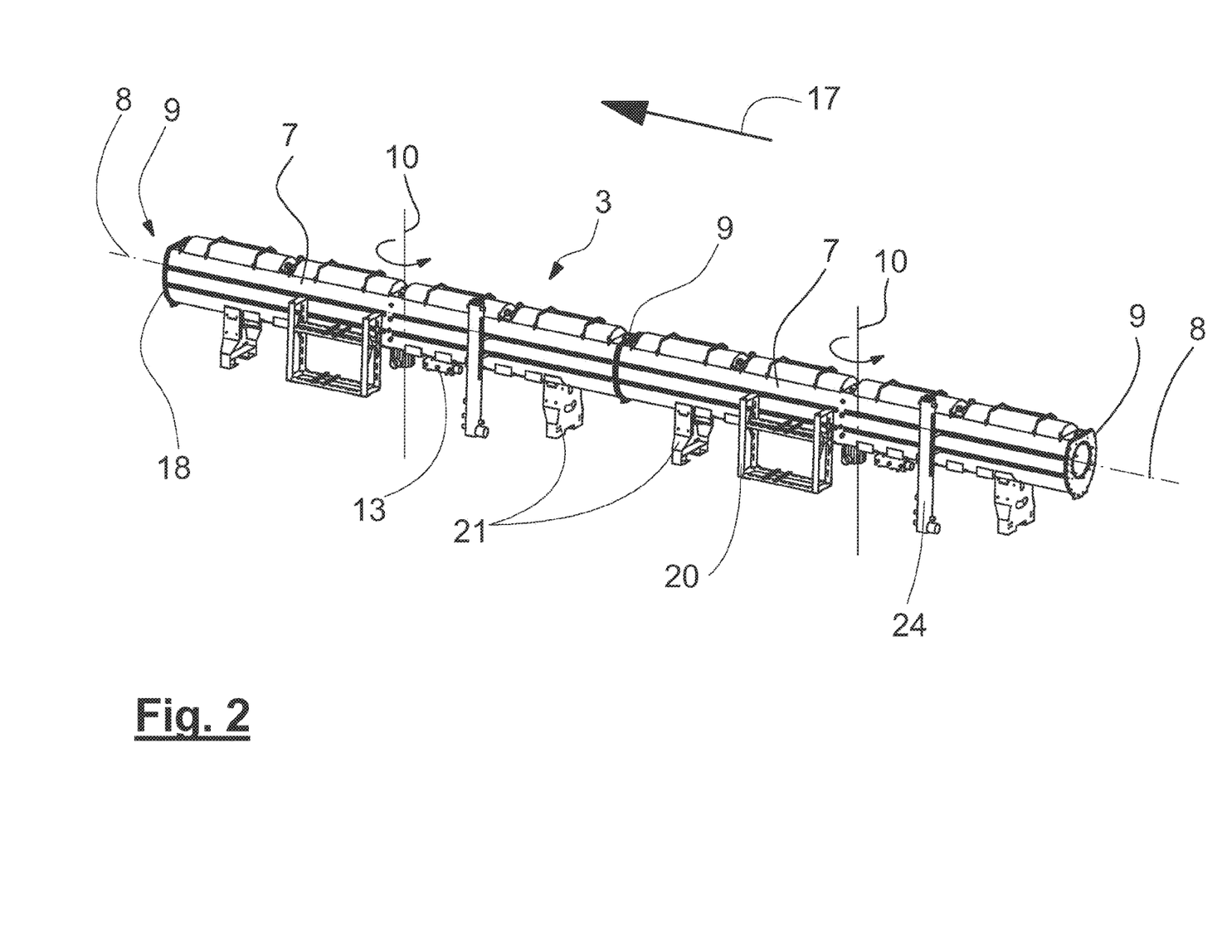

FIG. 2 schematically depicts the structure of a calibration and cooling line that illustrates the modular design. In this figure, four modules 7 are combined into one line. All four modules extend along the extrusion axis 8 and are connected by the connection areas 9. Each of the modules 7 features a connection area 9 in the form of a flange at both end faces, by means of which it is connected to an adjacent module 7. If a module 7 is rotated by 180 degrees around an imaginary axis 10 vertical to the extrusion axis 8, the connection area 9 of the opposite end face also fits the connection area 9 of the unrotated module 7.

Figure 4:
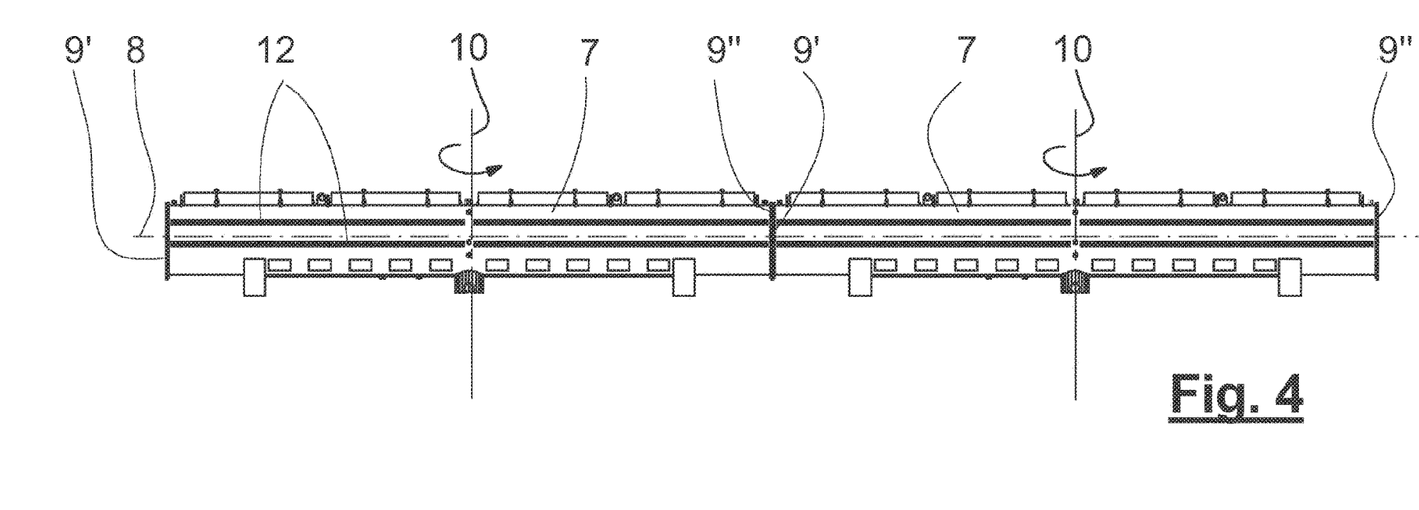
FIG. 4 and FIG. 5 illustrate the possibility of turning the module around.
Figure 5:
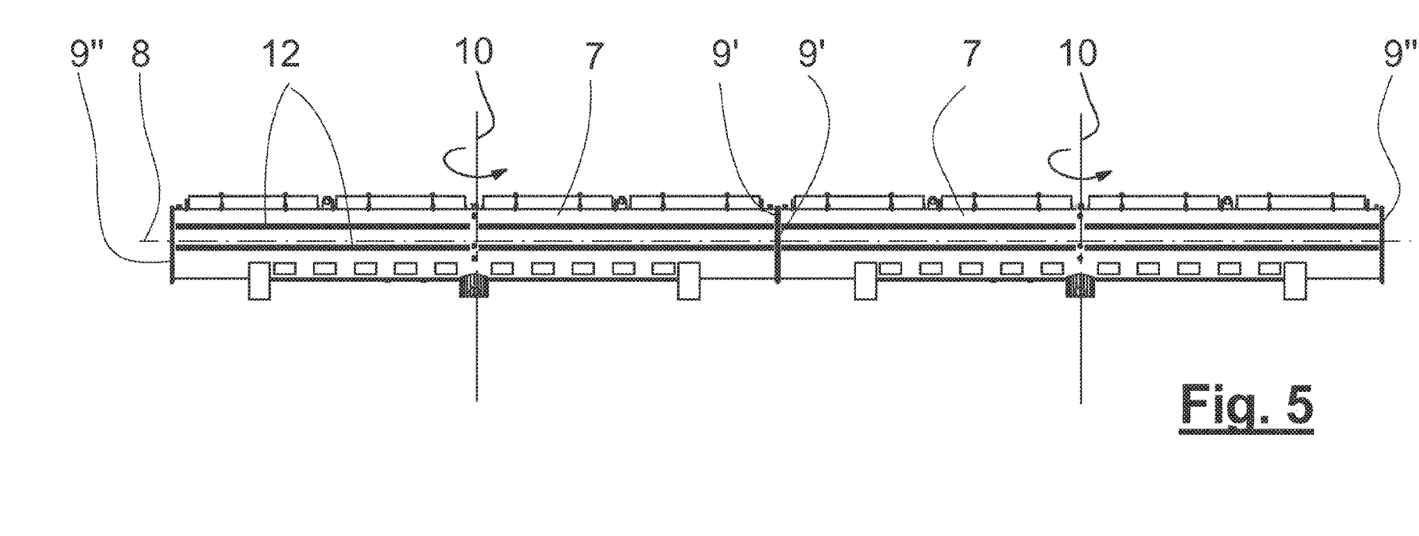

FIGS. 4 and 5 illustrate this again in greater detail.

The modules 7 stand on detachable pedestals 21. Water distributors 13 and mounting brackets 20 are installed at the C-profiles 12, which are arranged at the main body 19 of the modules 7. (At least) one outlet and further supply parts can also be installed.

Figure 3A:
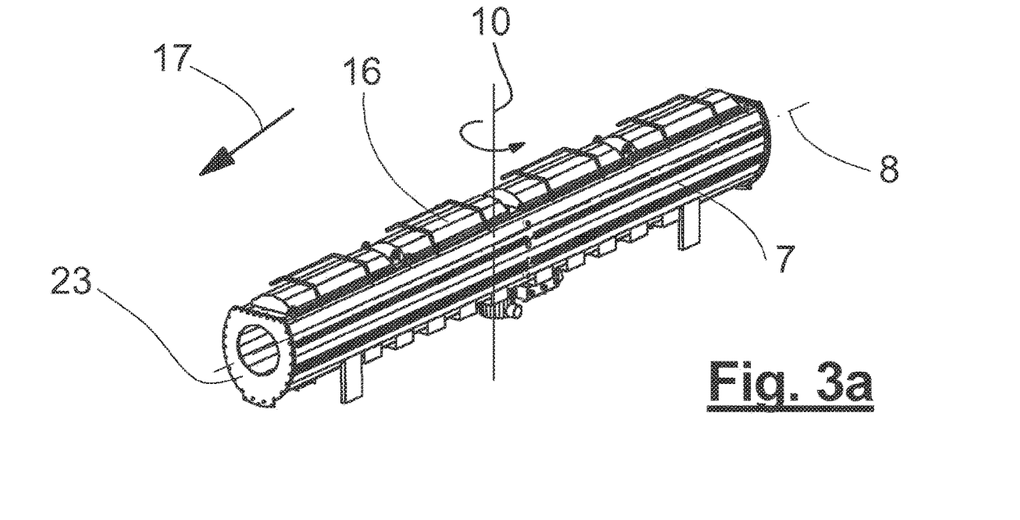
FIGS. 3a-c show the depiction of a module in perspective.

FIG. 3 shows a depiction of a module 7 in perspective, with the flange 18 extending outward that forms the connection area 9.

Figure 3B:
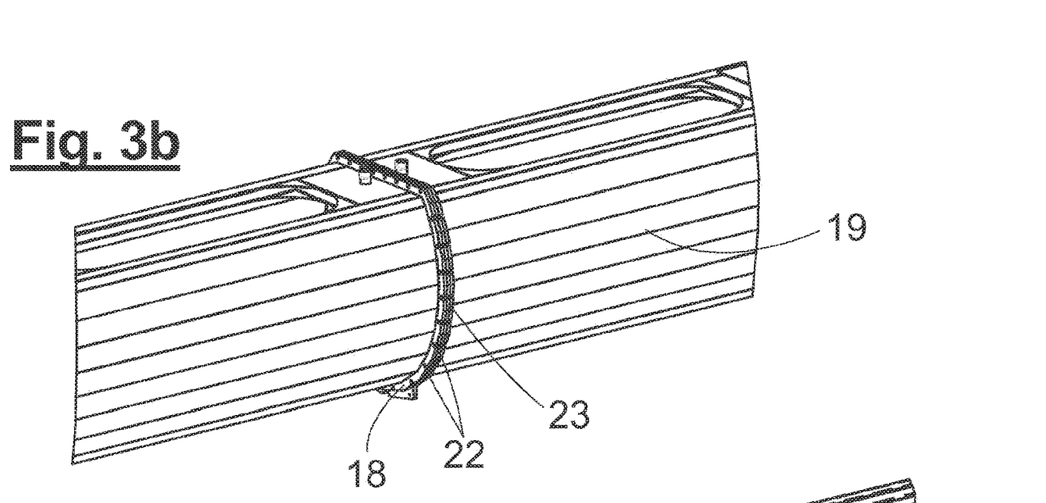
Figure 3C:
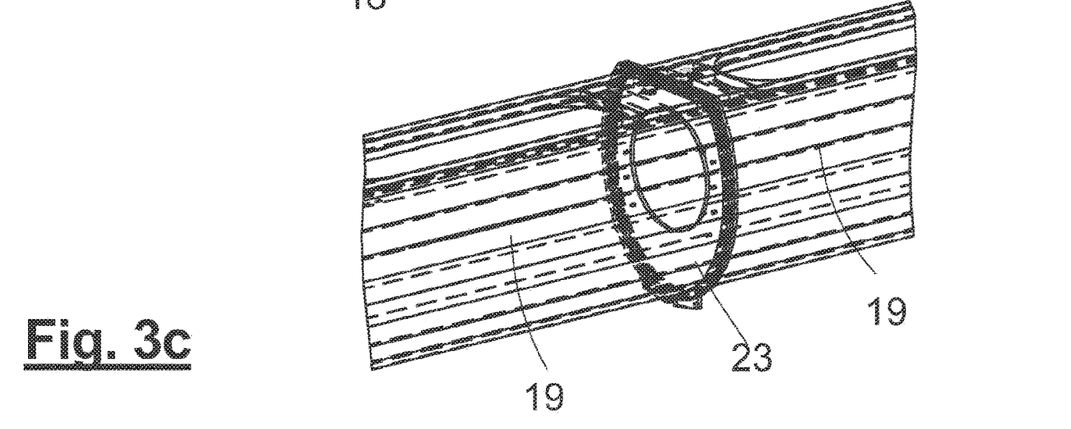

If a partition wall 23 as depicted at the end face of the module 7 in FIG. 3a is installed between two modules before the two modules 7 are connected, the result is a tank with two separate chambers to which different pressures like vacuums can be applied. This partition as well as the connection are depicted in the enlarged sections of FIGS. 3b and 3c. Equal parts are again numbered equally.

FIGS. 4 and 5 depict the possibility to rotate or exchange the order of the modules arranged in succession.

FIG. 4 shows two modules 7 in each of which the connection area 9' is connected to the connection area 9" of the adjacent module. In FIG. 5, the left module 7 is rotated by 180 degrees around the vertical 10 compared to FIG. 4, thus allowing for the connection of both connection areas 9'.

Figure 6:
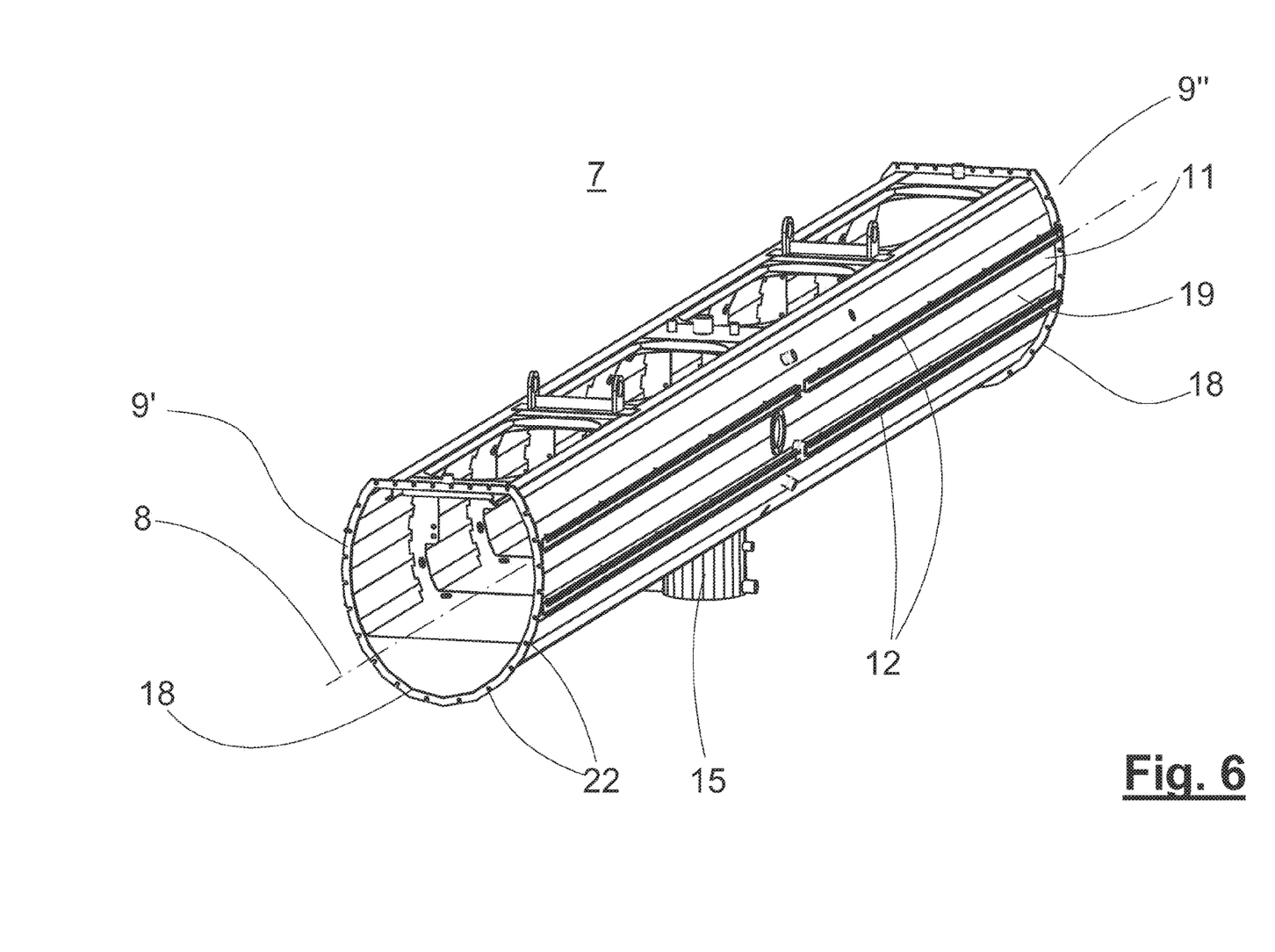
FIG. 6 shows the edged metal sheet of a module,
FIGS. 7a and b depict the mounting disks arranged in the module.

FIG. 6 shows a module 7 manufactured from a single-piece edged metal sheet 11 forming the main body. The attached flange 18 extends outward and is welded on separately. It can, however, also be manufactured from the same metal sheet as the main body, the edged flange 18 then extending outward relative to the extrusion axis. This allows for the interior of the tank to be designed largely smooth. The flange 18 features mounting openings 22 for the connection of two modules 7. If the flange 18 is manufactured by edging the base metal sheet, naturally an opening is created at each edge of the main body at the flange 18, which in turn can be used as a mounting opening 22 for the connection of two modules 7.

Each of the flanges 18 at the end face forms a connection area 9. The depiction of the module 7 in perspective shows a connection area 9' at one end face and the equal connection area 9" at the opposite end face of the module.

Figure 7A:
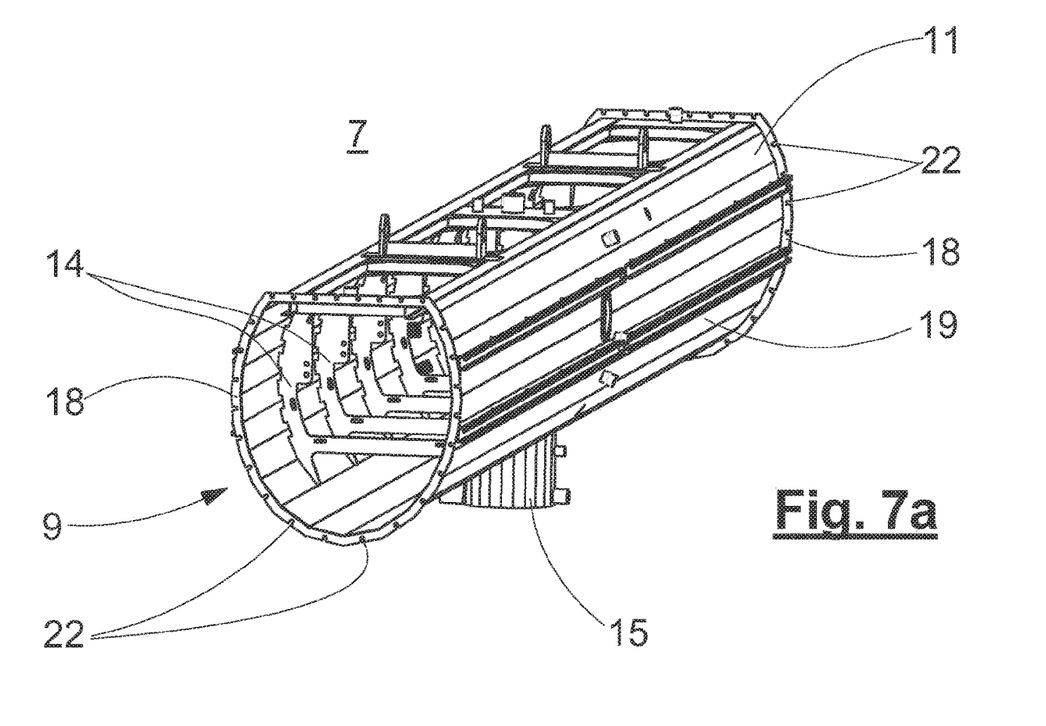
Figure 7B:
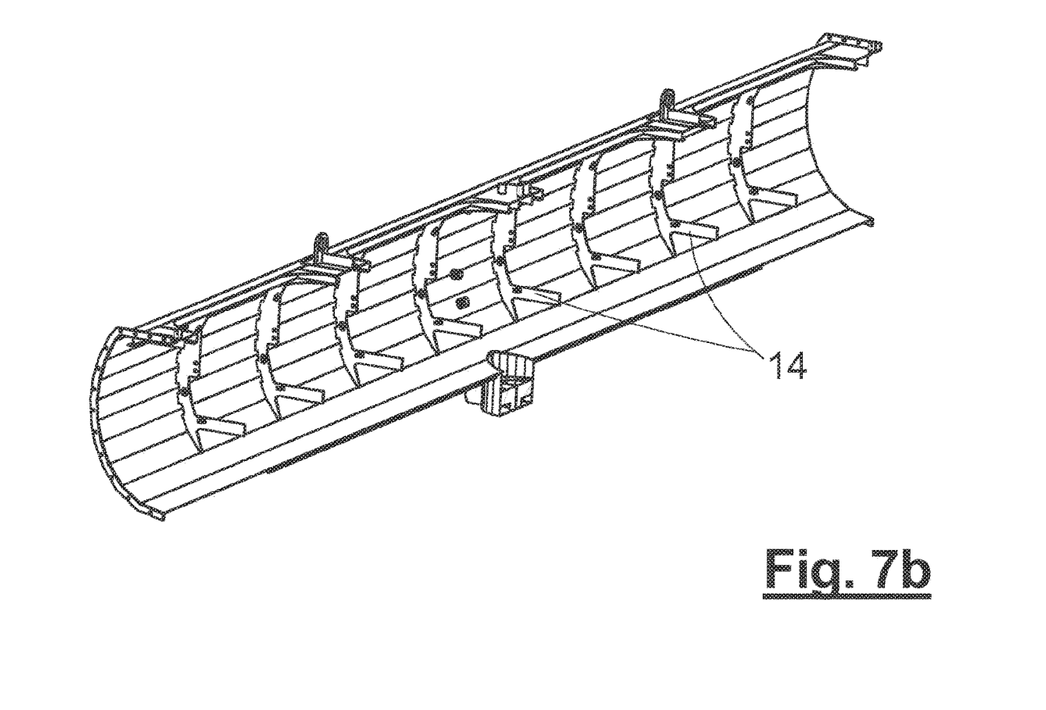

FIG. 7 shows mounting disks 14 installed in the module 7. These mounting disks 14 can be put to various uses; they can serve as support disks, but it is also possible to install multiple accessory components like support rollers for the produced tube, adjustment elements or the like.

FIG. 7a depicts the mounting disks 14 seen through the module 7 open to one side. In FIG. 7b this is more clearly illustrated in a sectional view. The module 7 is bisected along its longitudinal axis and only half of the module 7 is shown, thus making the parts inside the module 7 to be more easily identifiable.

Furthermore, a water reservoir 15 arranged below the module 7 as well as the flanges 18 that form the connection area 9 can be seen.

Figure 8:
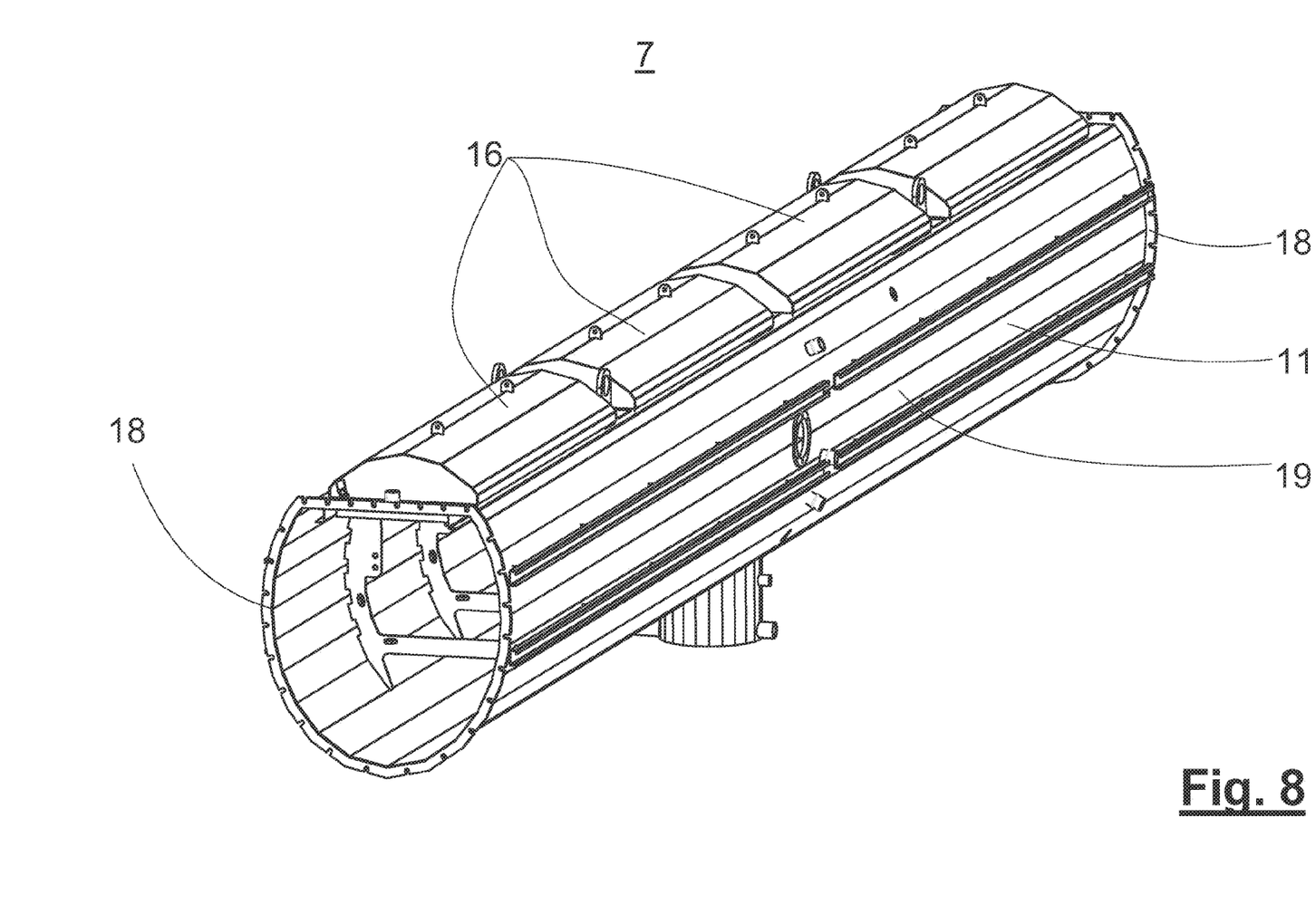
FIG. 8 depicts the uniform caps.

FIG. 8 shows uniform caps 16 that seal the opening of the module 7. The caps are all designed equal and thus exchangeable. The caps connect with the contour of the openings in the modules 7. In that way, they are locked in place once the vacuum is applied, thus serving as a further supporting element. Again, the flanges 18 and the main body edged from a metal sheet 11 are depicted here.

Figure 9:
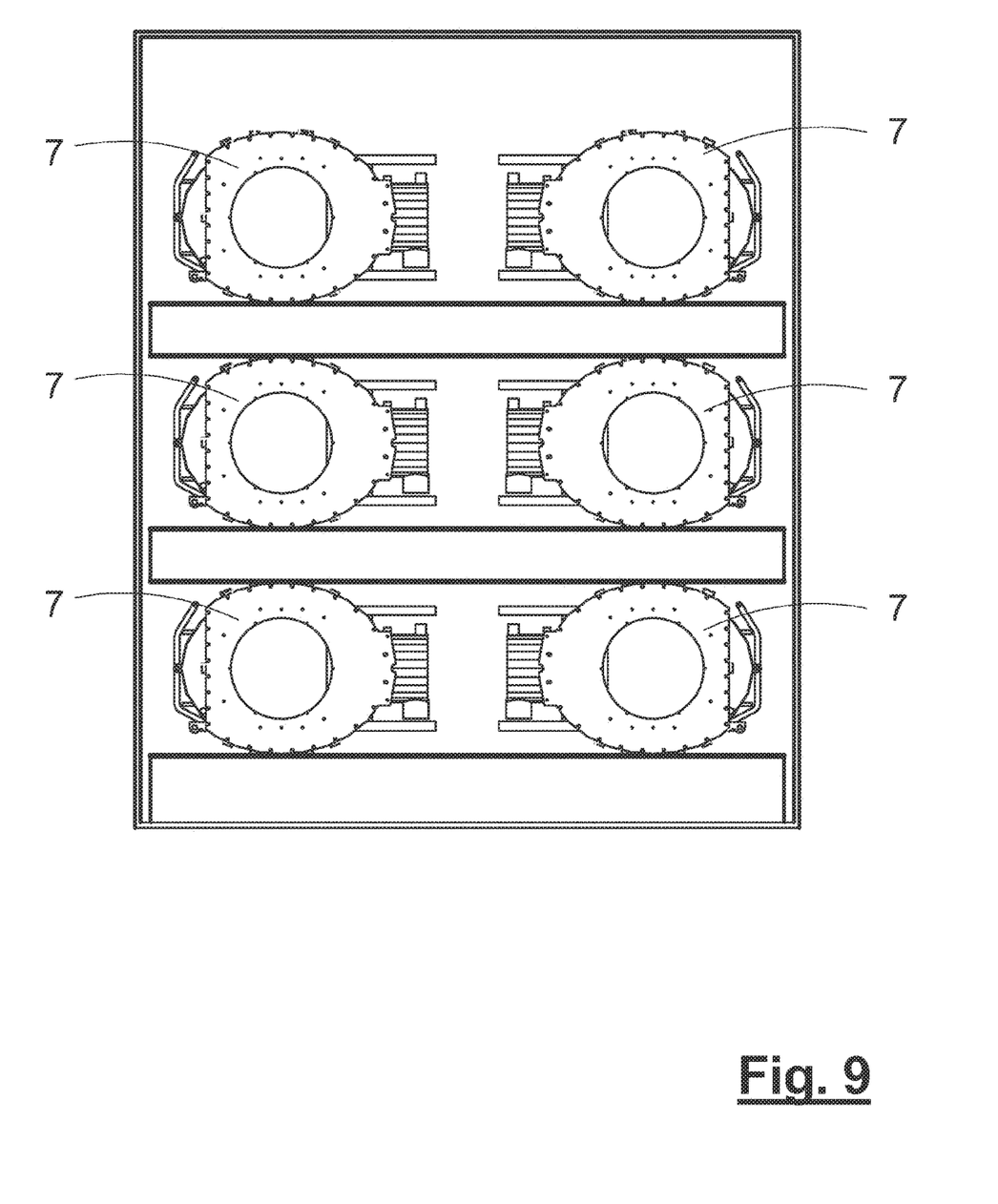
FIG. 9 shows the space-saving grouping of several modules.

FIG. 9 shows the space-saving grouping of several modules 7 inside an overseas shipping container, which is achieved especially through the detachable pedestals 21. Two modules 7 are placed adjacently on the C-profiles 12 in each case. The stable construction of the main body makes it possible to stow two more layers of modules stacked on top of one another, thus allowing for the modules to be shipped cost-efficiently in overseas containers.

Figure 10:
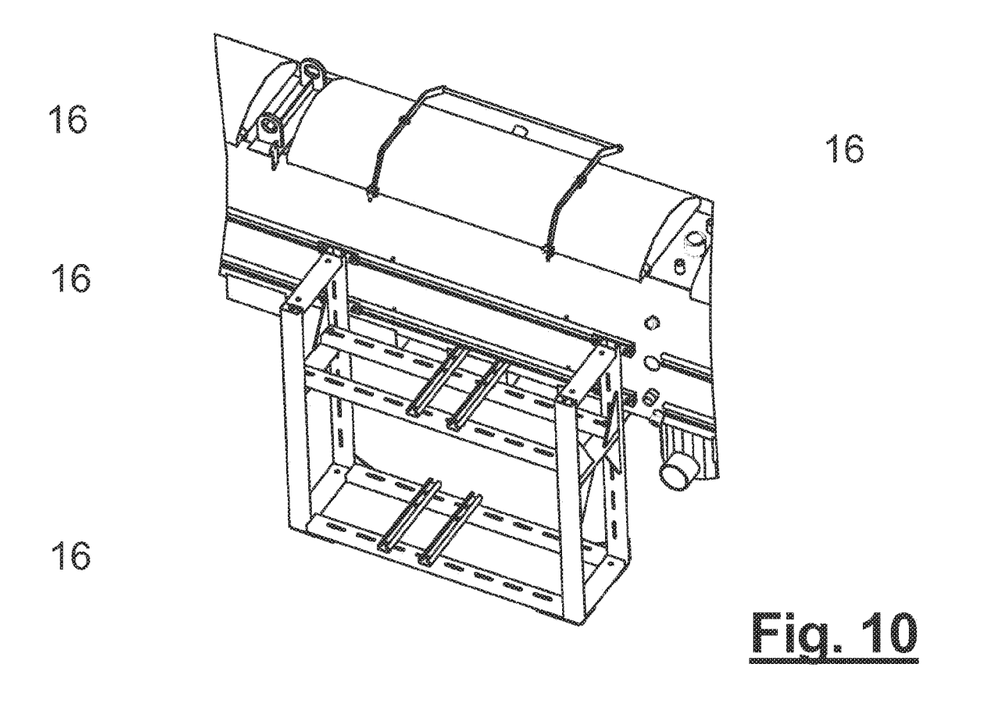
FIG. 10 is an enlarged section of FIG. 2.

FIG. 10 shows an enlarged section of FIG. 2 in which the console 20 for a pump can be seen more clearly. The console 20 is attached to the C-profile and designed in such a way that the mounting rails attached to it are in turn adjustable in their position. This has the great advantage that all current mounting feet for pumps can be inserted e.g. into the mounting rails and then mounted. The mounting bracket can therefore be flexibly adapted to the design or the required size of a pump. This very flexible design in turn allows for all further common accessory components in extrusion to be installed at the mounting bracket.

Figure 11:
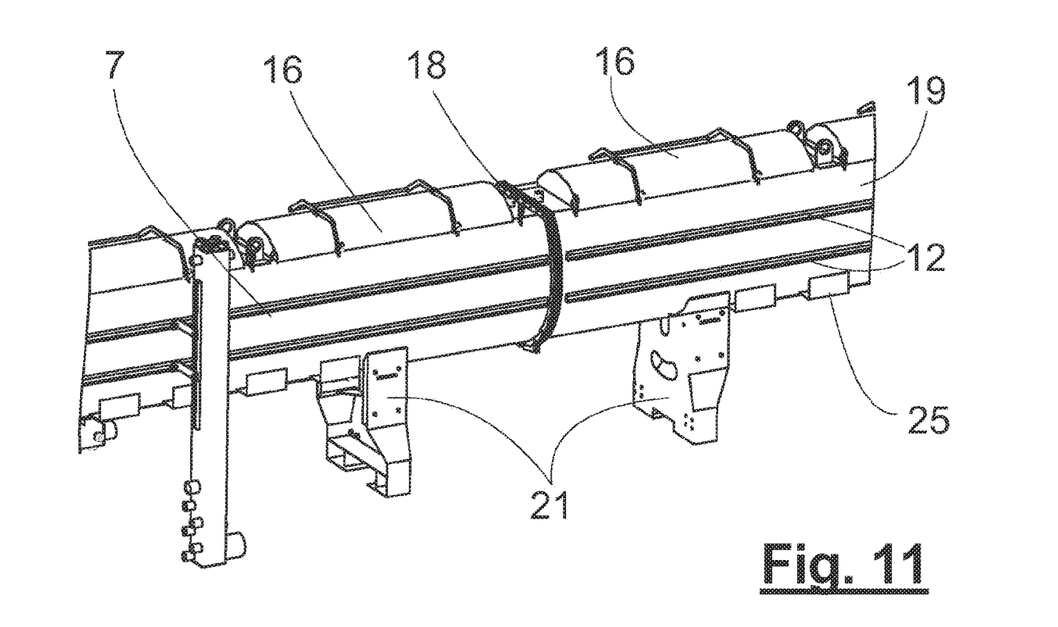
FIG. 11 is another enlarged section of FIG. 2,
FIG. 12 in turn shows a partial enlarged section of FIG. 2.

FIG. 11 shows another enlargement of FIG. 2 with an illustration of the part with the pedestals 21. The pedestals 21 are fastened to disks 25, which in turn are mounted to the main body 19. The pedestals 21 themselves in turn feature mounting openings to which extensions can be mounted to cover varying heights. FIG. 11 also shows again the flanges 18 for connecting the modules 7 as well as the caps 16 and a part of a console 20.

Figure 12:
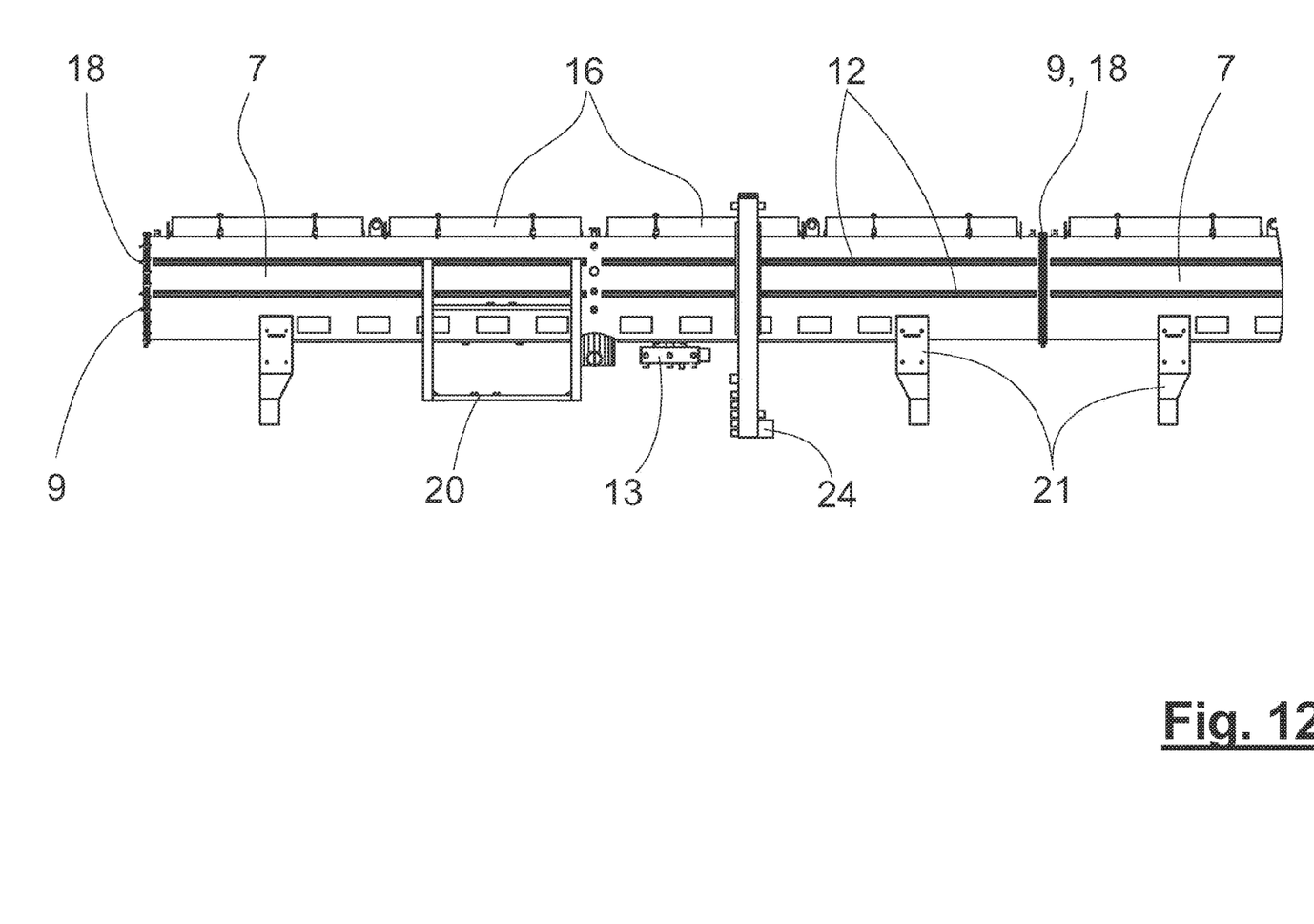

FIG. 12 again shows a partial enlargement of FIG. 2 in which an integrated view of the details described in FIGS. 10 and 11 is illustrated. The modules 7 are connected through flanges 18. (At least) one outlet 24 as well as a console 20 are mounted to the C-profiles 12. Below the module 7 a water distributor 13 can be seen and the modules 7 stand on pedestals 21.

Figure 13:
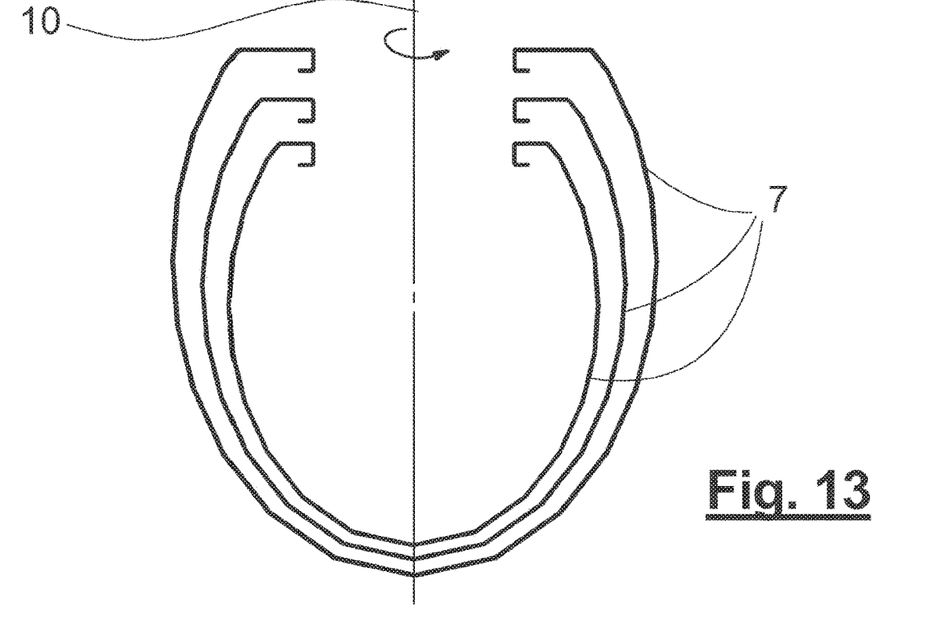
FIG. 13 illustrates the optimized section of the cap.

FIG. 13 illustrates the optimized area of the cap (not depicted here). Only the cross sections of the metal sheets of modules 7 of different sizes are depicted. It can clearly be seen that regardless of the varying cross sections the cut-outs for receiving the caps have identical dimensions. It thus becomes obvious that identical caps can be mounted to different tank sizes, the different tank sizes being in turn designed identical. The cross sections extend along the extrusion axis 8 and are designed in mirror symmetry around a vertical 10 to the extrusion axis 8.

Figure 14:
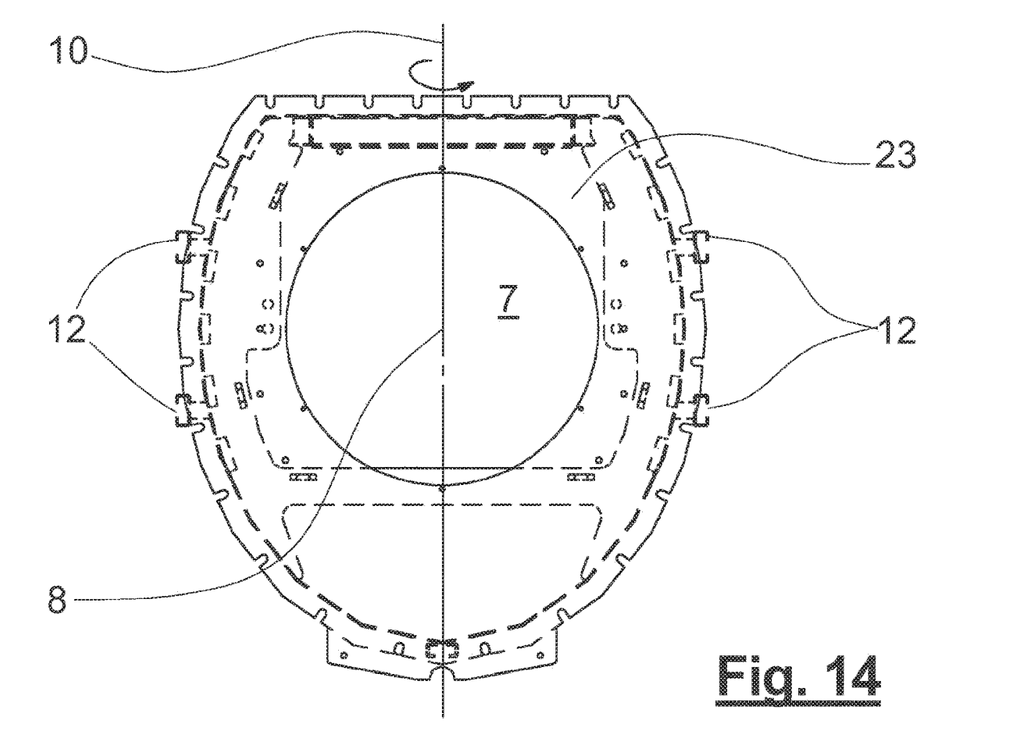
FIG. 14 shows in a cross-section of the module the arrangement of the C-profiles.

FIG. 14 is the cross section of a module 7 and illustrates the symmetrically arranged C-profiles 12. Relative to this cross section these are arranged in mirror symmetry to the vertical 10. Additionally, this figure shows the partition wall 23 described in greater detail in FIGS. 3a to 3c.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Extruder
 2 Extrusion die
 3 Calibration and cooling tank
 4 Extraction device
 5 Cutting device
 6 Profile
 7 Module
 8 Extrusion axis
 9 Connection area of 7
 10 Vertical to 8
 11 Metal sheet
 12 C-profile at 7
 13 Water distributor at 7
 14 Mounting disks
 15 Water reservoir
 16 Cap
 17 Extrusion direction
 18 Flange for 9
 19 Main body of 3
 20 Console for pump
 21 Pedestal
 22 Mounting opening
 23 Partition wall
 24 Outlet

The invention claimed is:

1. A calibration and cooling tank of an extrusion line arranged downstream of an extrusion die, the calibration and cooling tank configured to withstand being pressurized for calibrating a plastic melt exiting the extrusion die, the calibration and cooling tank extending along an extrusion axis, wherein:

the calibration and cooling tank has a main body and a modular configuration, at least one module forms a calibration and cooling line, the at least one module comprises a connection area at each end, the connection area at each end are each configured to attach to a respective further module, the connection area at each end each respectively comprising a flange extending outward from the main body of the calibration and cooling tank, and the main body comprises an outer shell extending between the respective connection area at each end, the outer shell having a consistent diameter and a cross section in the shape of an egg, wherein the at least one module is one of a plurality of modules, each of which having an identical shape of the outer shell and the connection area at each end.

2. The calibration and cooling tank according to claim 1, wherein the at least one module comprises at its portion of the main body manufactured from an edged or rolled metal sheet.

3. The calibration and cooling tank according to claim 1, wherein the connection area at each end of each of the plurality of modules are respectively a first connection area and a second connection area, which are configured in such a way that the first connection area of a first module of the plurality of modules is connectible to the second connection area of a second module of the plurality of modules.

4. The calibration and cooling tank according to claim 3, comprising a partition wall configured to be inserted between two modules of the plurality of modules, thus creating a tank with two chambers.

5. The calibration and cooling tank according to claim 1, wherein a module of the plurality of modules comprises a cap, the cap and a fixture for the cap inside the module are configured in such a way that the cap is locked in place in the fixture once vacuum is applied, thus becoming a supporting part of the calibration and cooling tank.

6. The calibration and cooling tank according to claim 1 comprising C-profiles mounted at a module of the plurality of modules for the fastening of accessory components.

7. The calibration and cooling tank according to claim 1 comprising a console for a pump arranged at the cooling and calibration tank.

8. The calibration and cooling tank according to claim 1 wherein the cooling and calibration tank includes detachable pedestals.

9. The calibration and cooling tank according to claim 1 further comprising mounting disks arranged inside the module.

10. The calibration and cooling tank of claim 1, wherein the egg shape is incompletely rounded.

11. The calibration and cooling tank of claim 1, wherein the egg shape is a truncated ovoid.

12. The calibration and cooling tank of claim 10, wherein the flange at each end has the egg shaped cross-section.

13. The calibration and cooling take of claim 1, wherein for each module of the plurality of modules, the connection area at each end are both configured to be connectible to the connection area at each end of the further module.

* * * * *